H. A. AND B. R. VAN VALKENBURG.
AUTOMATIC RECORD REWIND AND REPLAY MECHANISM FOR PIANO PLAYERS.
APPLICATION FILED NOV. 28, 1919.

1,420,594.

Patented June 20, 1922.

Inventor
Harold A. Van Valkenburg
Burt R. Van Valkenburg.

By Harry C. Schroeder
Attorney

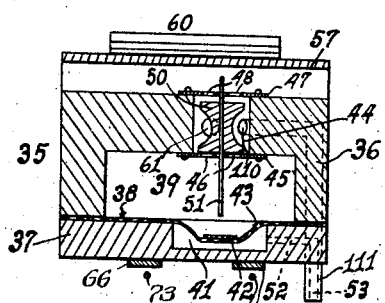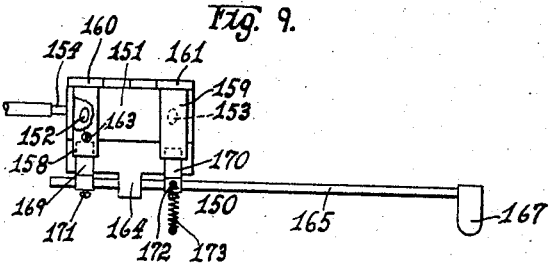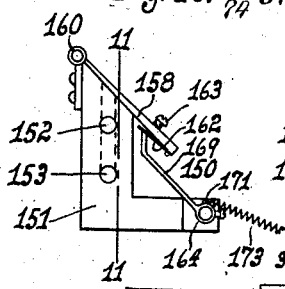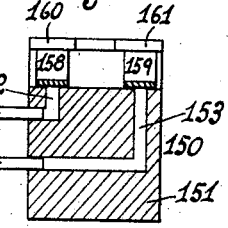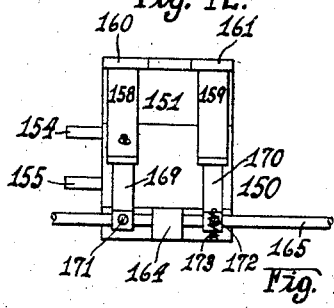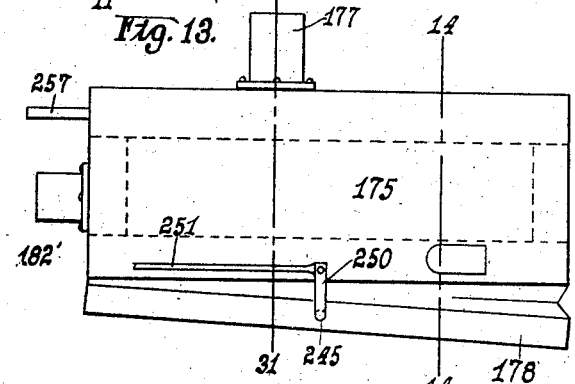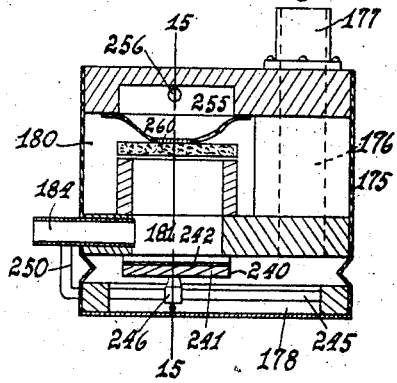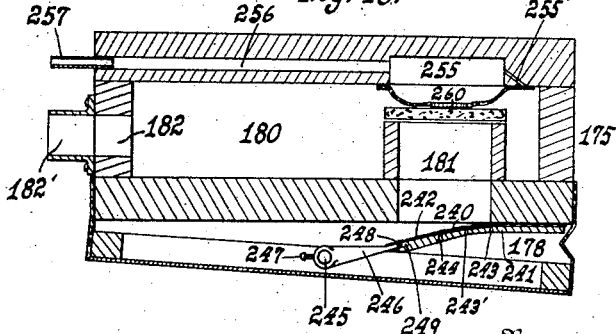

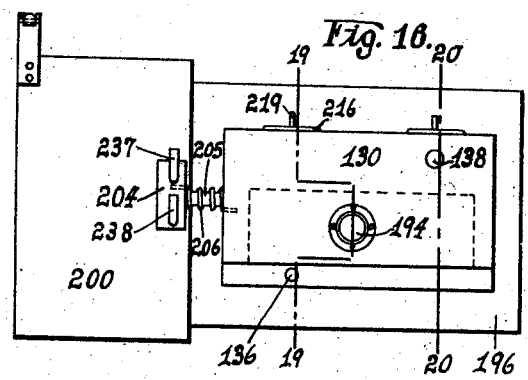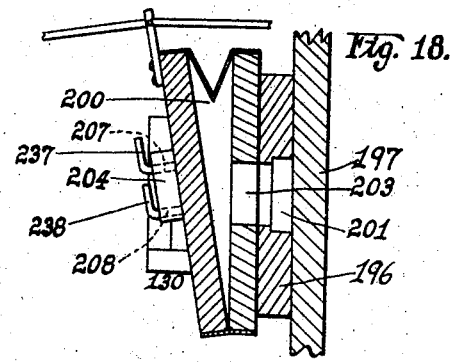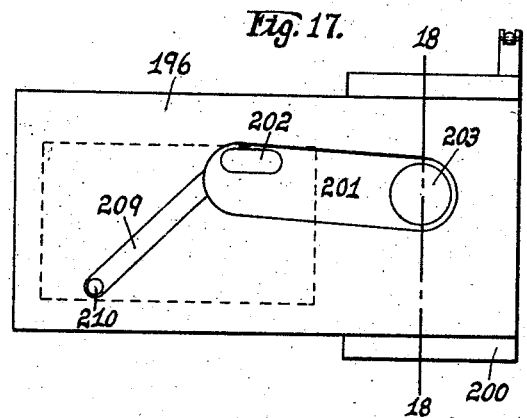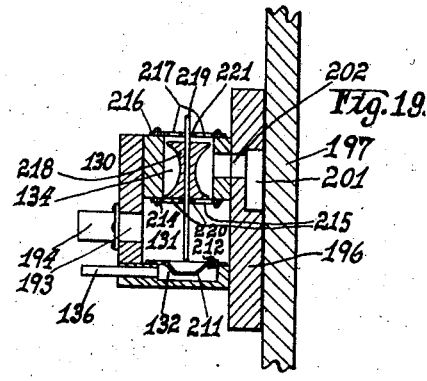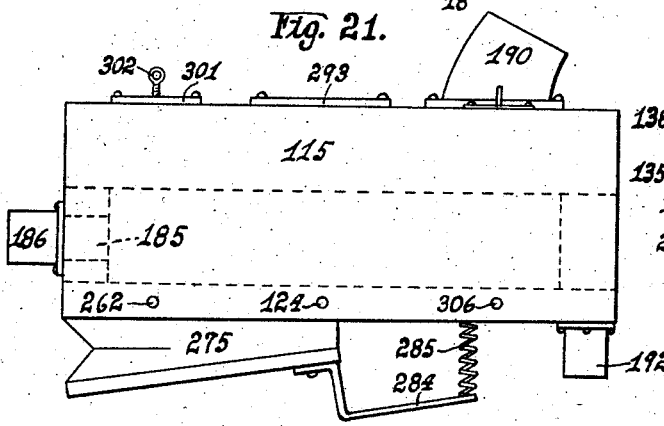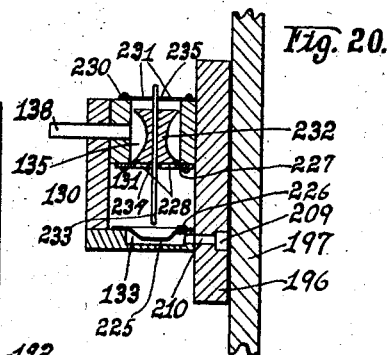

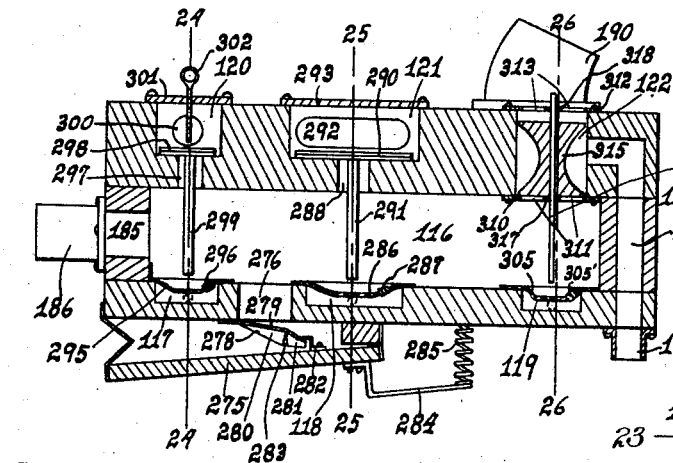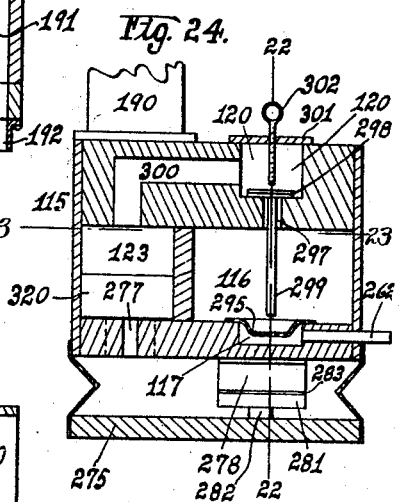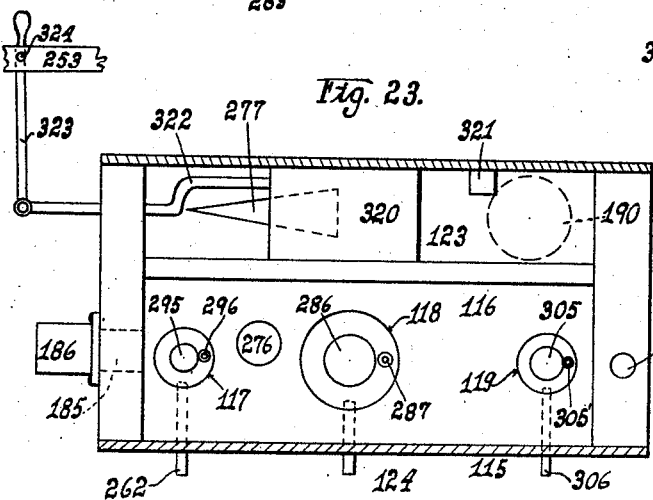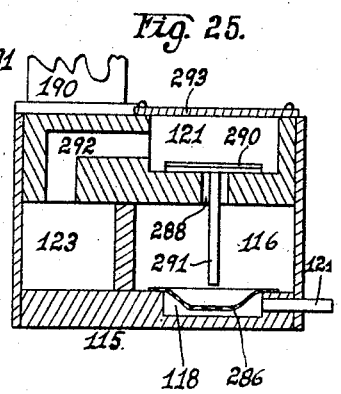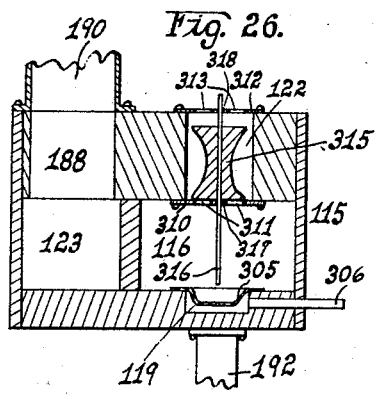

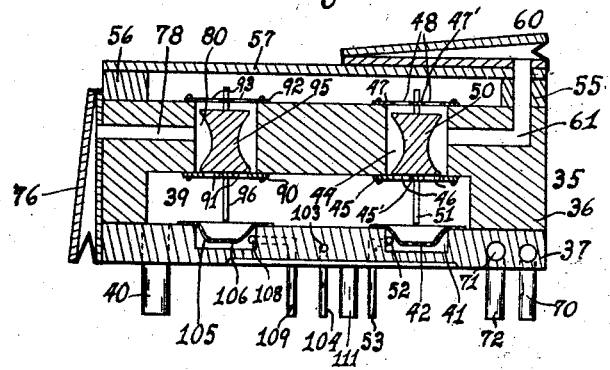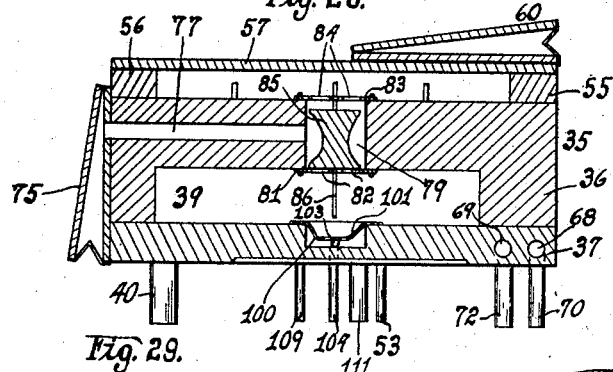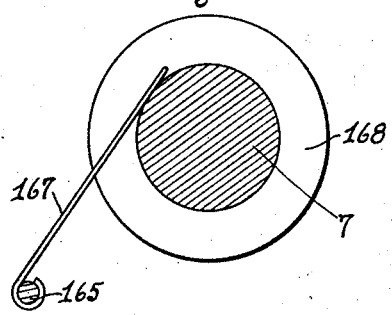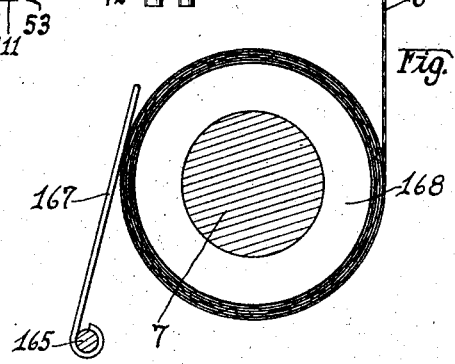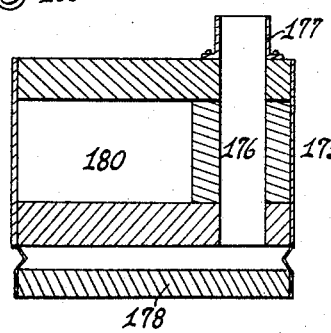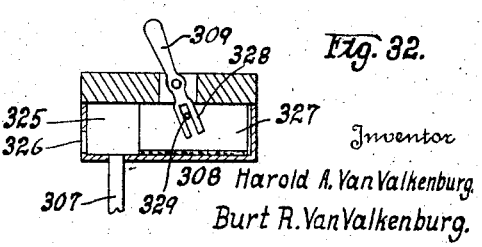

UNITED STATES PATENT OFFICE.

HAROLD A. VAN VALKENBURG AND BURT R. VAN VALKENBURG, OF OAKLAND, CALIFORNIA.

AUTOMATIC RECORD REWIND AND REPLAY MECHANISM FOR PIANO PLAYERS.

1,420,594.

Specification of Letters Patent.  Patented June 20, 1922.

Application filed November 28, 1919. Serial No. 341,171.

*To all whom it may concern:*

Be it known that we, HAROLD A. VAN VALKENBURG and BURT R. VAN VALKENBURG, citizens of the United States, residing at Oakland, in the county of Alameda and State of California, have invented certain new and useful Improvements in Automatic Record Rewinds and Replay Mechanism for Piano Players, of which the following is a specification.

Our invention is an automatic record rewind and replay mechanism for piano players.

Referring to the annexed drawings which form a part of this specification:

Figure 8 is a cross sectional view of the unit shown in Figure 2 taken on line 8—8 of said figure.

Figure 9 is a plan view of the timing valves and arm.

Figure 10 is an end view of the timing valves.

Figure 11 is a sectional view of the timing valves taken on line 11—11 of Figure 10.

Figure 12 is a front view of the timing valves.

Figure 13 is a side view of the vacuum control unit for the tracker bar and the rewind and replay shift control unit.

Figure 14 is a cross section of the unit shown in Figure 13 taken on line 14—14 of Figure 13.

Figure 15 is a longitudinal section of the unit shown in Figures 13 and 14 taken on line 15—15 of Figure 14.

Figure 16 is a front view of the rewind and replay shift pneumatic.

Figure 17 is a rear view of the rewind and replay shift pneumatic.

Figure 18 is a cross section of said shift pneumatic taken on line 18—18 of Figure 17.

Figure 19 is a cross section of said shift pneumatic taken on line 19—19 of Figure 16.

Figure 20 is a cross section of said shift pneumatic taken on line 20—20 of Figure 16.

Figure 21 is a side view of the rewind and replay pneumatic control unit.

Figure 22 is a longitudinal section of the rewind and replay pneumatic control unit taken on line 22—22 of Figure 24.

Figure 23 is a horizontal section of the unit shown in Figure 22 taken on line 23—23 of Figure 24.

Figure 24 is a cross section of the unit shown in Figure 22 taken on line 24—24 of said figure.

Figure 25 is a cross section of the unit shown in Figure 22 taken on line 25—25 of said figure.

Figure 26 is a cross section of the unit shown in Figure 22 taken on line 26—26 of said figure.

Figure 27 is a section of the rewind and replay shift control unit taken on line 27—27 of Figure 5.

Figure 28 is a section of said unit taken on line 28—28 of Fig. 5.

Figure 29 is a sectional view taken on line 29—29 of Figure 1 showing the finger of the timing and replay control device sprung into the groove in the winding spool, after the record has been unwound from said spool, whereby said device operates to cause replaying of the record.

Figure 30 is a view similar to Figure 29 with the record partly wound on the winding spool and the finger of the timing and replay control device engaging the wound record and holding said device in position causing the winding spool to wind the record slowly to play.

Figure 31 is a cross section of the vacuum control unit taken on line 31—31 of Figure 13.

Figure 32 is a sectional view of the valve which controls the rewind and replay shift pneumatic.

Figure 1:
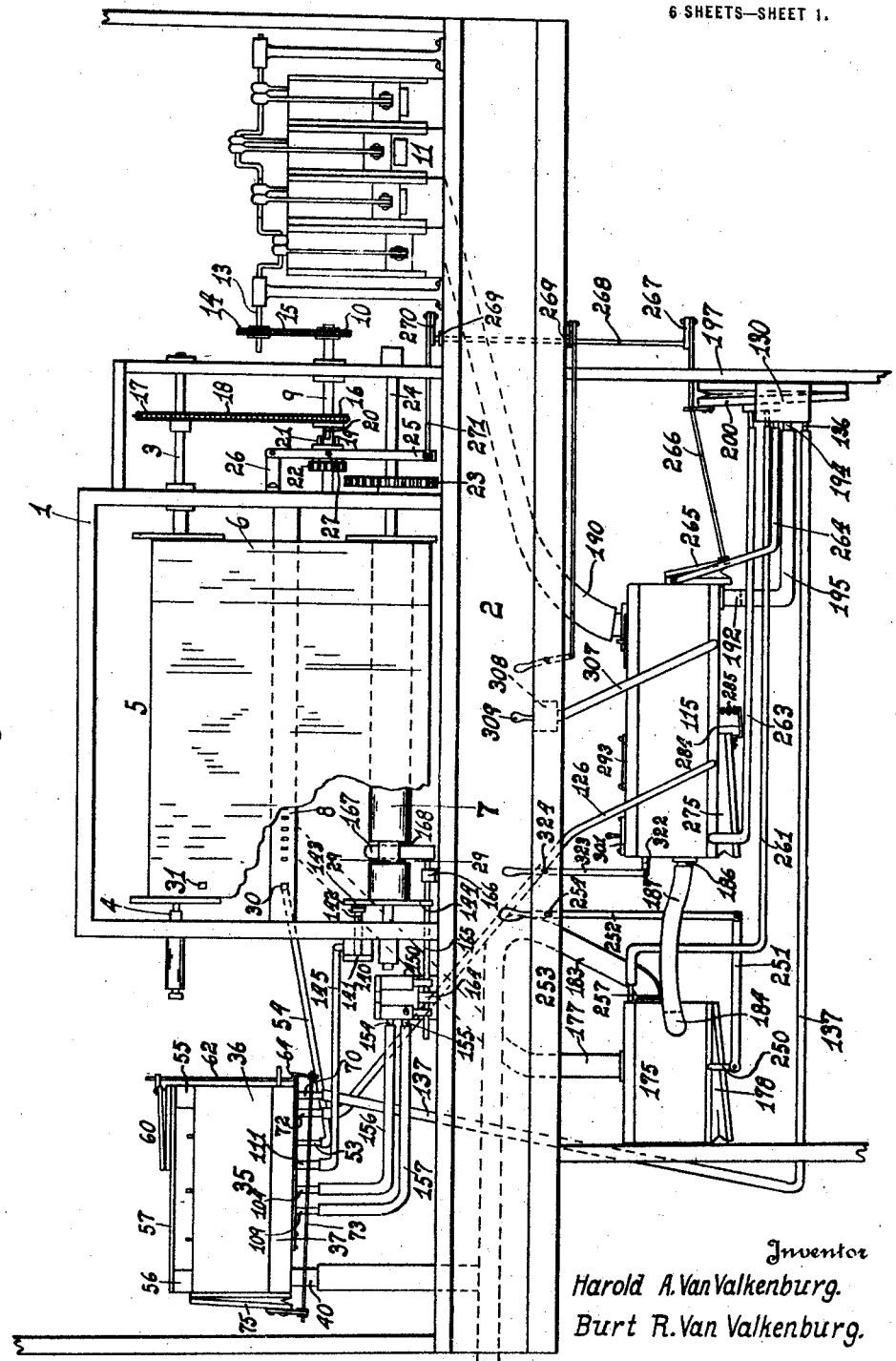
Figure 1 is a front elevation of our invention.
Figure 2:
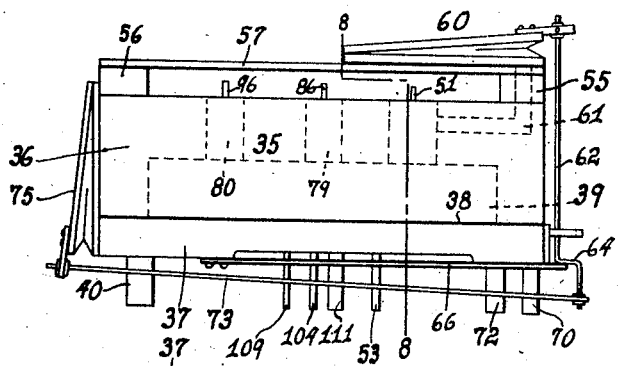
Figure 2 is a side view of the rewind and replay pneumatic control unit.
Figure 3:
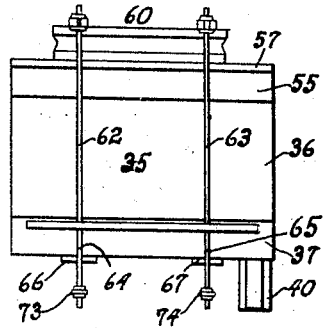
Figure 3 is an end view of the unit shown in Figure 2.
Figure 4:
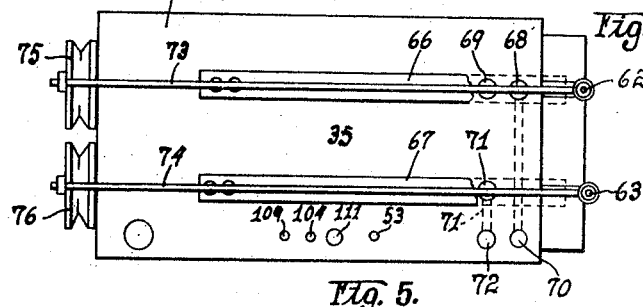
Figure 4 is a bottom plan of the unit shown in Figure 2.
Figure 7:
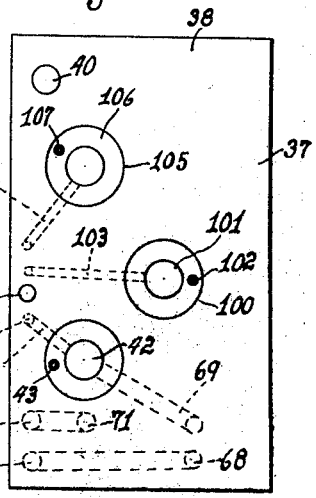
Figure 7 is an upper plan of the lower section of the unit shown in Figure 2.
Figure 5:
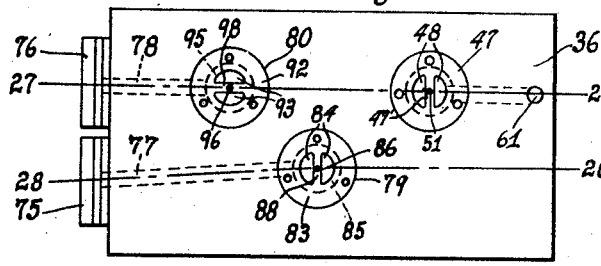
Figure 5 is a top plan view of the unit shown in Figure 2 with the upper part thereof removed.
Figure 6:
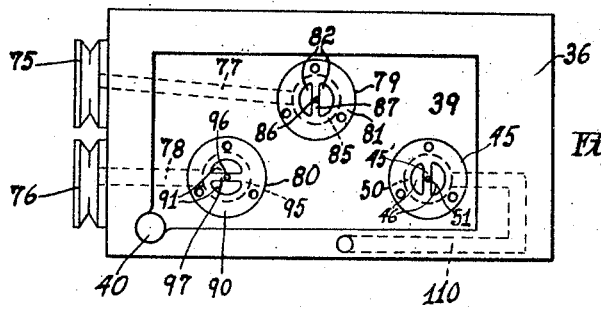
Figure 6 is a bottom plan of the unit shown in Fig. 2 with the lower section thereof removed.

In the drawing 1 indicates a player piano spool and tracker frame which is mounted on a bar 2 of the player piano. In the upper part of said frame are journals 3 and 4 for a record spool 5 carrying a perforated record 6. In the lower part of said frame is journaled a winding spool 7 for winding said record upon itself and drawing the record across a tracker bar 8 mounted in the frame 1 between the record and winding spools. A jack shaft 9 is journaled in the frame 1 on which is secured a sprocket 10. A vacuum motor 11 is mounted on the bar 2 on the crank shaft 13 of which is secured a sprocket 14 over which and the sprocket 10 travels a chain 15. On the shaft 9 is loosely mounted a sprocket 16 and on the record spool journal 3 is secured a sprocket 17 over which sprockets travels a chain 18. A clutch 19 is mounted on shaft 9 comprising a member 20 on sprocket 16 and a member 21 slidably keyed on said shaft. A pinion 22 is secured to clutch member 21 on the shaft 9 for engaging a gear 23 secured on the winding spool shaft 24. A lever 25 is pivoted to a bracket 26 on the frame 1 and carries a pin 27 which engages clutch member 21.

In the tracker bar 8 near its left end we provide a vent 30 and in the record 6 near its left edge and inner end we provide a perforation 31 adapted to register with vent 30 when the record has been played.

A rewind and replay pneumatic control unit 35 includes a body 36 and a plate 37 secured to the lower face of said body, a sheet of pouch leather 38 being secured between said body and said plate. The body 36 is formed with a vacuum chamber 39 from which leads a tube 40 which connects to a vacuum pump (not shown). In the plate 37 of unit 35 is formed an air chamber 41, the sheet 38 forming a pouch 42 across the chamber, said pouch being formed with a bleed hole 43. The upper wall of the body 36 is provided with an opening 44 extending from the vacuum chamber 39 to the atmosphere. A disk 45 is secured to the under side of the upper wall of the body 36 over the opening 44, which disk is provided with ports 46. A disk 47 is secured to the top of the body 36 over the opening 44, which disk is provided with ports 48. A valve 50 is confined in the opening 44 between the disks 45 and 47 and normally rests upon disk 45 and closes ports 46, the valve being mounted on a stem 51 which extends through and is reciprocatively mounted in bearings 45′ and 47′ in the disks 45 and 47. The plate 37 is provided with a port 52 from which extends a nipple 53. A tube 54 connects to nipple 53 and to vent 30 in the tracker bar 8. Strips 55 and 56 are secured to the body 36 across the top at the ends of the body, and a plate 57 is secured on said strips, upon which plate is secured a pneumatic 60, the movable end of said pneumatic resting over the strip 55. A port 61 extends from the opening 44 through the body 36 and strip 55 into pneumatic 60. To the movable member of pneumatic 60 are connected two vertically depending rods 62 and 63 formed respectively with shoulders 64 and 65 which respectively engage the free ends of spring valves 66 and 67 secured at their other ends to the under side of the plate 37 of unit 36. The valve 66 controls two ports 68 and 69, the port 69 connecting with the air chamber 41 in unit plate 37. A nipple 70 is connected to the port 68. The valve 67 controls a port 71 to which a nipple 72 is connected. The lower ends of rods 62 and 63 are respectively connected to one end of rods 73 and 74, the other end of said rods being connected to the movable member of pneumatics 75 and 76 secured to one end of unit 35. Ports 77 and 78 in unit body 36 connect at one end to pneumatics 75 and 76 respectively and at their other end to openings 79 and 80 respectively, which openings extend through the upper wall of unit body 35 from chamber 39 to the atmosphere. A disk 81 is secured to the under side of the upper wall of the unit body 36 over the opening 79, which disk is provided with two ports 82. A disk 83 is secured to the top of body 36 over opening 79, which disk is provided with two ports 84. A valve 85 is confined in the opening 79 by the disks 81 and 83, which valve normally rests upon disk 81 and closes the ports 82, said valve being mounted on a rod 86 which extends through and is reciprocatively mounted in bearings 87 and 88 in the disks 81 and 83. A disk 90 is secured to the under side of the upper wall of unit body 36 over opening 80, which disk is provided with two ports 91. A disk 92 is secured to the top of unit body 36 over opening 80, which disk is provided with two ports 93. A valve 95 is confined within the opening 80 by disks 90 and 92, which valve normally rests upon disk 90 and closes ports 91, the valve being mounted on a rod 96, which extends through and is reciprocatively mounted in bearings 97 and 98 in disks 91 and 93 respectively. In the plate 37 below the valve 85 is formed an air chamber 100 over the top of which extends the sheet 38 forming a pouch 101, said pouch being provided with a bleed hole 102. The plate 37 is provided with an air port 103 which leads to chamber 100 and is connected to a nipple 104. In the plate 37 below the valve 95 is formed an air chamber 105 over the top of which extends the sheet 38 forming a pouch 106, said pouch being formed with a bleed hole 107. A port 108 is provided in plate 37 which leads to air chamber 106 and is connected to a nipple 109. A port 110 is provided in the unit body 36 and plate 37, leading from the opening 44 out through said plate, a nipple 111 being connected to its outer end.

A rewind and replay pneumatic shift control unit 115 constitutes an element of our invention. Said unit is formed with a main vacuum chamber 116, air chambers 117, 118 and 119 below said vacuum chamber, valve chambers 120, 121 and 122 above said vacuum chamber and respectively above said air chambers, and with a secondary vacuum chamber 123. A tube 124 extends into the lower part of the unit 115 and communicates with chamber 118. A tube 126 connects to nipple 72 and tube 124.

A rewind and replay shift pneumatic chest 130 constitutes an element of our invention. Said chest is formed with a vacuum chamber 131, air chambers 132 and 133 and valve chambers 134 and 135 directly above said air chambers respectively. A nipple 136 leads from chamber 132 through the wall of chest 130. A tube 137 connects to nipple 70 and to nipple 136. A nipple 138 leads from valve chamber 135 through the front wall of the chest.

A winding spool brake 140 is mounted on frame 1 at one end of winding spool 7, said brake including a pneumatic 141, a brake rod 142 connected to the movable member of said pneumatic, and a brake shoe 143 connected to the end of said rod to engage a disk 144 on one end of the winding spool. A tube 145 connects to nipple 111 and to pneumatic 141.

On the bar 2 is mounted a pneumatic timing and replay control unit 150. In a block 151 of said unit is provided two ports 152 and 153 leading from one side through the top thereof. Nipples 154 and 155 respectively connect to the ends of ports 152 and 153 in the side of block 151. A tube 156 connects to nipples 104 and 154. A tube 157 connects to nipples 109 and 155. The top of the block 151 is inclined downwardly and forwardly. Valves 158 and 159 extend across the top of block 151 over the ports 152 and 153 respectively, said valves being hinged at their upper rear ends to said block by hinges 160 and 161 respectively. Said valves extend forwardly of the forward edge of the top of block 151. To the under side at the forward end of said valves are secured flat spring strips 162 which may be adjusted away from the valves by set screws 163 extending through the valves. In a bearing 164 extending forwardly of the base of block 151 is journaled one end of a shaft 165, the other end of which is journaled in a bearing 166 on bar 2. To the further end of shaft 165 is secured a finger 167 which extends forwardly and upwardly at an angle in registration with an annular groove 168 in winding spool 7. Fingers 169 and 170 are secured to shaft 165 by set screws 171 and 172 which fingers extend upwardly and rearwardly at an angle into engagement with the under side of the spring strips 162 on the valves 158 and 159 respectively. A spring 173 is connected at one end to set screw 172 and at its other end to the bar 2, which spring tends to rotate the shaft 165 clockwise.

A vacuum control unit 175 controls the vacuum of the tracker bar 8 and the rewind and replay pneumatic shift control unit 115. The unit 175 has a port 176 extending therethrough from top to bottom thereof, to the upper end of which is connected a vacuum tube 177 which leads from the vacuum pump (not shown), the lower end of said port leading into a regulating pneumatic 178 on the bottom of the unit. The unit 175 has a vacuum chamber 180, a port 181 leading through the bottom of the unit from the pneumatic 178 into said chamber, and a port 182 leading from said chamber through an end wall of the unit. A nipple 182' is connected to the end of the unit 175 in communication with port 182. A vacuum tube 183 is connected to nipple 182' and to the vacuum chamber of the tracker bar 8. A nipple 184 leads from port 181 through the side wall of unit 175.

The rewind and replay shift control unit 115 has a port 185 leading from the chamber 116 through one end wall thereof. A nipple 186 is secured to the outside of said unit end wall in register with port 185. A vacuum tube 187 connects to nipples 184 and 186. A port 188 leads from the secondary chamber 123 of unit 115 through the top of the unit. A vacuum tube 190 connected to the unit 115 in communication with port 188, leads from the motor 11. The unit has a port 191 leading from chamber 122 through one end wall out through the bottom thereof, and a nipple 192 is secured to the bottom of the unit in communication with the outer and lower end of said port.

The rewind and replay pneumatic shift chest 130 has a port 193 extending through a side wall thereof, and a nipple 194 is connected to said wall in communication with said port. A tube 195 connects to nipples 192 and 194. The rear wall 196 of chest 130 is secured to a wall 197 depending from bar 2. A rewind shift pneumatic 200 is secured to the chest wall 196 at one end of the chest. In the rear of chest wall 196 is recessed a passage 201, which is closed at the rear by wall 197. Port 202 is provided in the chest leading from the chamber 134 into the passage 201. A port 203 leads from passage 201 through the wall 196 into the pneumatic 200. A valve 204 is pivotally mounted in front of pneumatic 200 on a stud 205 projecting from one end of chest 130. A spring 206 is coiled around said stud, one end of the stud being secured to the chest and the other end secured to the valve. Ports 207 and 208 extend through the valve 204. The spring 206 tends to turn the valve 204 clockwise toward the pneumatic 200 (see Fig. 18), thus insuring good contact of the inner face of the valve with the front wall of said pneumatic and effectively closing the inner end of ports 207 and 208 when the pneumatic is expanded. The passage 201 has an extension 209 which leads downwardly to a port 210 communicating with the chamber 133. A pouch 211 is secured to the lower wall of the chest 130 over the chamber 132, said pouch being provided with a bleed hole 212. A disk 214 is secured to the under side of the upper wall of chest 130 across the lower end of valve chamber 134, said disk being provided with ports 215. A disk 216 is secured to the top of the chest over the top of valve chamber 134 which disk is provided with ports 217. A valve 218 is mounted in chamber 133 on a stem 219 reciprocatively mounted in bearings 220 and 221 in disks 214 and 216 respectively, said valve normally resting upon disk 214 and closing ports 215. A pouch 225 is secured to the lower wall of the chest over the chamber 133, said pouch being provided with a bleed hole 226. A disk 227 is secured to the under side of the upper wall of the chest 130 across the lower end of the valve chamber 135, said disk being provided with ports 228. A disk 230 is secured to the top of the chest over the top of the chamber 135, said disk being provided with ports 231. A valve 232 is mounted within the chamber 135 on a stem 233 reciprocatively mounted in bearings 234 and 235 in disks 227 and 230 respectively. Nipples 237 and 238 are secured to the valve 204 leading from ports 207 and 208 respectively.

To the bottom of the vacuum control unit 175, within the pneumatic 178 is secured a flap valve 240 extending across the lower end of port 181. Said valve consists of a thin layer of wood 241 and a layer of felt 242 on top of said wood layer. Notches 243, 243' and 244 are cut in the under side of the valve strip 241, forming hinges to give the valve proper flexibility in swinging to close or open the lower end of port 181. A rock shaft 245 is suitably journaled in the pneumatic 178 and extends through one side of said pneumatic. An arm 246 is adjustably secured on shaft 245 within the pneumatic 178 by a set screw 247 and carries a pin 248 engaging a slot 249 in the outer end of the layer 241 of valve 240. To the outer end of shaft 245 is secured a crank 250 which is pivotally connected to one end of a link 251, the other end of which link is pivotally connected to the lower end of accent lever 252 which extends upwardly through the front plate 253 of the piano and is pivoted to said plate by pivot 254. The unit 175 is provided with an air chamber 255 in the under side of its upper wall and a port 256 leading from said chamber through said upper wall out through one end of the unit. A nipple 257 is fitted in the outer end of port 256. A pouch valve 260 is secured to the under side of the upper wall of the unit 175 under the chamber 255 and directly over the upper end of port 181. A tube 261 connects to nipples 257 and 238. A nipple 262 extends through the lower part of the unit 115 into the air chamber 117. A tube 263 connects to nipples 237 and 262. A tube 264 connected to nipple 138 leads into a replay shift pneumatic 265 mounted on the unit 115. A rod 266 is pivotally connected to the movable members of pneumatics 265 and 200 and to a crank 267 on the lower end of a vertical rod 268 journaled in bearings 269 in bar 2 and extending through said bar. A crank 270 is secured on the upper end of rod 268 and is connected to one end of a link 271, the other end of said link being connected to clutch lever 25.

An equalizer pneumatic 275 is mounted on the under side of unit 115. A port 276 leads from the main chamber 116 through the lower wall of said unit into said pneumatic. A port 277 leads through the lower wall of said unit from said pneumatic into the secondary chamber 123. An equalizer valve 278 controls the port 276. Said valve includes a piece of felt 279 secured to the under side of unit 115 at one side of the lower end of port 276, and a piece of wood 280 secured to the under side of said piece of felt. A tongue 281 is formed on the forward end of the part 280, the upper edge of which is engaged by a clip 282 secured to the lower movable member of the equalizer pneumatic 275. A notch 283 is cut in the under side of the part 280 forming a bending point to give the valve 278 the proper flexibility to prevent the valve from flapping. A bracket 284 is secured to the forward part of the movable member of the equalizer pneumatic 275 and a spring 285 is secured at its ends to said bracket and to the unit 115, which spring tends to collapse said pneumatic. A pouch 286 is secured to the lower wall of chamber 116 across the air chamber 118, said pouch being provided with a bleed hole 287. A port 288 is provided in the upper wall of unit 115 leading from chamber 116 into chamber 121. A valve 290 located in chamber 121 normally rests upon the lower wall of said chamber and closes the port 288. A stem 291 depends from the valve 290 through port 288 to a point a short distance above pouch 286. A port 292 leads from chamber 121 through the upper wall of unit 115 into the secondary vacuum chamber 123. A plate 293 is secured to the top of the unit 115, covering the top of chamber 121. A pouch 295 is secured to the lower wall of chamber 116 across the top of air chamber 117, said pouch being provided with a bleed hole 296. A port 297 is provided in the upper wall of unit 115 leading from chamber 116 into chamber 120. A valve 298 located in chamber 120 normally rests over the top of port 297 and closes said port. A stem 299 depends from said valve through port 297 to a point slightly above pouch 295. A port 300 leads from chamber 121 through the upper wall of unit 115 into the secondary vacuum chamber 123. A plate 301 is secured to the top of unit 115 over the chamber 120. A screw 302 is screwed into plate 301 adapted to limit the opening of valve 298. By means of said screw the opening of said valve may be adjusted. A pouch 305 is secured to the lower wall of unit 115 over the air chamber 119. A nipple 306 leads from chamber 119 out through the lower part of the unit 115. A tube 307 is connected to nipple 306 and to air valve 308 mounted in the plate 253, the handle 309 of which valve projects above said plate. A disk 310 is secured to the under side of the upper wall of the unit 115 over the lower end of the chamber 122, said disk being provided with ports 311. A disk 312 is secured to the top of said unit across the top of the chamber 122, said disk being provided with ports 313. A valve 315 is mounted within the chamber 122 upon a stem 316 which is reciprocatively mounted in bearings 317 and 318 in disks 310 and 313 respectively, said stem depending to a point slightly above the pouch 305. The port 277 converges lengthwise. A valve 320 is mounted in secondary chamber 123 to slide upon the lower wall thereof lengthwise over the port 277. A stop 321 secured to the wall of chamber 123 limits the opening movement of valve 320. A rod 322 is connected to valve 320 which extends through one end wall of the unit 115 and is connected to the lower end of an operating lever 323 which extends upwardly through plate 253 and is pivoted to said plate by pivot 324.

The valve 308 includes an air chamber 325 provided with an air inlet 326 and a slide 327 mounted in said chamber adapted to slide over the inner end of the tube 307 which communicates with said chamber. The lever 309 has a fork 328 into which projects a pin 329 from slide 327 whereby the slide is operated by the lever.

The operation of our invention is as follows:

The record spool 5 being placed on the journals 3 and 4 and the record 6 connected to the winding spool 7, the piano motor switch is closed and the piano motor drives the piano vacuum pump in the usual manner. Vacuum is established by said pump in chamber 39 of unit 35 through tube 40; in chamber 180 of unit 175 through tube 177, port 176, equalizer pneumatic 178, and port 181, in tracker bar 8 through tube 177, port 176, equalizer pneumatic 178, port 181, chamber 180, port 182, nipple 182′ and tube 183; in chamber 116 of unit 115 through tube 177, port 176, pneumatic 178, port 181, nipple 184, tube 187 and nipple 186; in motor 11 through tube 177, port 176, pneumatic 178, port 181, nipple 184, tube 187, nipple 186, port 185, chamber 116, port 276, pneumatic 275, port 277, chamber 123, port 188 and tube 190; and in chamber 131 of chest 130, through tube 177, port 176, pneumatic 178, port 181, nipple 184, tube 187, nipple 186, port 185, chamber 116, ports 311, (the valve 308 being open and air being admitted through port open, valve chamber 325, tube 307, and nipple 326 into chamber 119, and the valve 315 being opened by the engagement of pouch 305 with stem 316), and through valve chamber 122, port 191, nipple 192, tube 195 and nipple 194. The motor 11 is operated by the vacuum therein and rotates winding spool 7 through the medium of motor shaft 13, sprocket 14, chain 15, sprocket 10, shaft 9, pinion 22, gear 23 and shaft 24, said pinion being in mesh with said gear. The rotation of spool 7 winds the record thereon across the tracker bar 8 and the vacuum supplied to said bar as described plays the record on the piano in the usual manner.

When the record has been played the perforation 31 registers with vent 30 in the tracker bar and air is admitted through said perforation and vent, tube 54, nipple 53, and port 52, into air chamber 41. The air in said chamber raises the pouch 42 which engages the stem 51 and lifts valve 50, opening ports 46 and closing ports 48. Vacuum is established in pneumatic 60 from chamber 39 through ports 46, opening 44 and port 61, which collapses said pneumatic and forces rods 62 and 63 downwardly and the shoulders 64 and 65 of said rods against the valves 66 and 67, opening said valves and uncovering ports 68 and 69 and port 71. Additional air is admitted through port 69 into air chamber 41 which maintains the pouch 42 expanded and the valve 50 open after the perforation 31 passes the vent 30 and the record closes said vent and until the record has been rewound. Vacuum is established in pneumatic 141, from chamber 39 through ports 46, chamber 44, port 110, nipple 111, and tube 145, and the brake 140 is put on the flange 144 of the winding spool 7 so that said spool may not rotate backwardly faster than the record is unwound therefrom. Air is admitted through port 68, nipple 70, tube 137 and nipple 136 into air chamber 132, which raises pouch 211 and opens valve 218. Vacuum is established in pneumatic 200, from chamber 131, through ports 215, chamber 134, port 202, passage 201 and port 203, causing said pneumatic to collapse and shift pinion 22 out of mesh with gear 23 and to shift the clutch 19 into operation, through the medium of rod 266, crank 267, shaft 268, crank 270, link 271, and lever 25. The motor 11 then rotates the record spool 3, backwardly, through the medium of motor crank shaft 13, sprocket 14, chain 15, sprocket 10, shaft 9, clutch 19, sprocket 16, chain 18, sprocket 17 and journal 3, and the record 6 is rewound on the record spool, and unwound from spool 7 which is rotated backwardly. The collapsing of pneumatic 200 opens valve 204 and admits air through port 208, nipple 238, tube 261, nipple 257, port 256 into chamber 255 which expands pouch valve 260, and closes port 181, and shuts off the vacuum in the chamber 180, port 182, nipple 182′, tube 183 and tracker bar 8, while the record is being rewound. Air is admitted through port 71, tube 126, and nipple 124 into air chamber 118, which raises pouch 286 and high speed valve 290 and materially increases the vacuum in motor 11 from chamber 116 through port 288, chamber 121, port 292, chamber 123 and tube 190, thus causing the motor to rewind the record at a high speed. The opening of valve 204 admits air through port 207, nipple 237, tube 263, and nipple 262 into air chamber 117, raising pouch 295 and slow speed valve 298 and providing vacuum in secondary chamber 123 from chamber 116, through port 297, chamber 120 and port 300 which at this time adds to the reverse speed of the motor and the rewinding speed of the record.

As the record is rewound upon record spool 5 and unwound from winding spool 7, the arm 167 is swung forwardly under the influence of spring 173 against the unwinding record on spool 7 and when said arm engages the record near the end of its unwinding from spool 7, the arm 170 (which is set in advance of arm 169) lifts valve 159, and admits air through port 153, nipple 155, tube 157, nipple 109 and port 108 into chamber 105. The air admitted into chamber 105 raises pouch 106 against valve stem 96 and raises valve 95, establishing vacuum in pneumatic 76 from chamber 39 through ports 91, chamber 80, and port 78 and collapsing said pneumatic which, through rod 74, trips the shoulder 65 of rod 63 off the end of valve 67 which springs closed, closing ports 71. The closing of port 71 shuts off the air from chamber 118 (see Fig. 22) through tube 126, whereupon the high speed valve 290 drops upon its seat and shuts off vacuum in chamber 123 from chamber 116 through port 288, chamber 121, and port 292, thus greatly reducing the vacuum in the motor 11, which then runs at a slower speed on the remaining vacuum supplied to the motor from chamber 116 through port 297, chamber 120, and port 300, and from said chamber through port 276, equalizer pneumatic 275, and port 277, through chamber 123 and tube 190. When the record 6 completes its rewinding to a point where all the music perforations of the record have passed above the tracker bar and the forward end of the record has left the arm 167 but not the spool 7, said arm swings forwardly into groove 168 in the spool 7 under the influence of spring 173 and the arm 169 lifts valve 158 and admits air through port 152, nipple 154, tube 156, nipple 104 and port 103 into air chamber 100. The air admitted into air chamber 100 raises pouch 101 against valve stem 86 and raises valve 85 establishing vacuum in pneumatic 75 from chamber 39 through ports 82, chamber 79 and port 77, and collapsing said pneumatic which through rod 73 trips the shoulder 64 of rod 62 off the end of valve 66 which springs closed, closing ports 68 and 69. The closing of port 69 shuts off air through said port into chamber 41, the air being also shut off from said chamber through port 52, nipple 53, tube 54 and vent 30 by the record over the vent, and the air in said chamber is exhausted through bleed hole 43 by the vacuum pump, whereupon the valve 50 drops upon disk 45 and closes ports 46, shutting off the vacuum in pneumatic 60 through said ports, chamber 44 and port 61 which pneumatic expands under pressure of air admitted therein through ports 48, chamber 44 and port 61, and draws rods 62 and 63 upwardly until the shoulders 64 and 65 swing over the ends of valves 66 and 67 respectively. The closing of port 68 shuts off air through said port, nipple 70, tube 137 and nipple 136, from chamber 132, whereupon the air is exhausted from said chamber through bleed hole 312 and valve 218 drops upon disk 214 and closes ports 215. The dropping of valve 218 shuts off vacuum to pneumatic 200 through ports 215, chamber 134, port 202, passage 201 and port 203, and to chamber 133 through ports 215, chamber 134, port 202, passage 201, extension 209 and port 210, and admits air into pneumatic 200 through ports 217, chamber 134, port 202, passage 201, and port 203, and into air chamber 133 through ports 217, chamber 134, port 202, passage 201, extension 209 and port 210. The air admitted into chamber 133 raises pouch 225 which, engaging stem 233, raises valve 232, and establishes a vacuum in replay shift pneumatic 265, from chamber 131, through ports 228, chamber 135, nipple 138 and tube 264, which collapses said pneumatic. The collapsing of pneumatic 265, through the medium of rod 266, crank 267, shaft 268, crank 270, link 271 and lever 25, shifts clutch 19 out of operation and the pinion 22 into mesh with gear 23, whereupon the winding spool 7 is rotated forwardly by motor 11, through motor shaft 13, sprocket 14, chain 15, sprocket 10, shaft 9, pinion 22, gear 20 and shaft 24, and the record 6 is wound on said spool and drawn over the tracker bar 8. The admission of air into pneumatic 200 and the collapsing of pneumatic 265 closes the valve 204 and its ports 207 and 208. The closing of port 208 shuts off air through said port, nipple 238, tube 261, nipple 257, port 256 to chamber 255 and the air is exhausted from chamber 255 through a bleed hole 255' leading from the chamber into vacuum chamber 180, whereupon the valve 260 is lifted off its seat over port 181 and vacuum is established in the tracker bar, from said vacuum chamber through port 182, nipple 182', and tube 183, and the record is played. The closing of port 207 shuts off air through said port, nipple 237, tube 263, and nipple 262 to air chamber 117, and the air is exhausted from said chamber through bleed hole 296, causing the pouch 295 to collapse and the valve 298 to drop on its seat and close port 297 which shuts off vacuum to the motor 11 through said port, chamber 120, port 300, chamber 123 and tube 190. Vacuum is then supplied to the motor from chamber 116 only through port 276, pneumatic 275, port 277, chamber 123 and tube 190 and the motor is run slowly for playing the record in the usual manner. When the record is played the above described operation is repeated as many times as desired.

When the rewinding of the record is nearly completed, by closing the valve 308, the shifting of the pinion 22 into mesh with gear 23 and replaying of the record may be prevented so that the record may be completely rewound and removed from its journals and another record placed into position to be played. The closing of valve 308 shuts off air through valve port 326, valve chamber 325, tube 307 and nipple 306 to air chamber 119, whereupon the air in said chamber is exhausted therefrom through bleed hole 305' in pouch 305 and the valve 315 drops on disk 310 and closes ports 311. The closing of ports 311 shuts off vacuum through said ports, chamber 122, port 191, nipple 192, tube 195, nipple 194 and port 193 to vacuum chest 131, which prevents vacuum in replay shift pneumatic 265 from said chest and the operation of said pneumatic. When a new record is put in place, upon opening valve 308 the pneumatic 265 will be operated to shift the pinion 32 into mesh with gear 23 to play the record as above described.

By swinging the lever 323 the valve 320 may be shifted over the port 277 to vary the vacuum and speed of the motor and the time of the music.

By swinging lever 252 the valve 240 may be swung toward or away from the lower end of port 181 to vary the vacuum supplied to the tracker board and cause the piano to play loudly or softly.

Having described our invention, we claim:

1. In combination with a player piano, means for automatically rewinding the record at a high speed, for automatically reducing the rewinding speed when the rewinding is nearly complete, and for automatically replaying the record at a still slower speed.

2. In combination with a player piano, a finger engaging the record on the winding spool as the record unwinds therefrom, and means actuated by said finger when the record is nearly rewound for rewinding the record at a slower speed and for automatically replaying the record at a still slower speed when the record has been rewound.

3. In combination with a player piano, the tracker bar thereof being provided with a rewind control vent, the music record being provided with a rewind control perforation adapted to register with said vent when the record has been played, an air chamber connected to said vent, a pouch over said air chamber, a pneumatic, a valve actuated by the expansion of said pouch under the influence of the air admitted into said chamber through said record perforation and said tracker bar vent to create vacuum into said pneumatic, said chamber being provided with an air port, a port controlling valve opened by said pneumatic for admitting air through said port into said chamber to maintain vacuum in said pneumatic, another valve opened by said pneumatic, means actuated by said latter valve when opened for enabling the motor to rewind the record and to shut off the vacuum from the tracker bar.

4. In combination with a player piano, the tracker bar thereof being provided with a rewind control vent, the music record being provided with a rewind control perforation adapted to register with said vent when the record has been played, an air chamber connected to said vent, a pouch over said air chamber, a pneumatic, a valve actuated by the expansion of said pouch under the influence of the air admitted into said chamber through said record perforation and said tracker bar vent to create vacuum into said pneumatic, said chamber being provided with an air port, a port controlling valve opened by said pneumatic for admitting air through said port into said chamber to maintain vacuum in said pneumatic, another valve opened by said pneumatic, means actuated by said latter valve when opened for enabling the motor to rewind the record and to shut off the vacuum from the tracker bar, and means for automatically enabling said latter valves to close when the record is rewound.

5. In combination with a player piano, the tracker bar thereof being provided with a rewind control vent, the music record being provided with a rewind control perforation adapted to register with said vent when the record has been played, an air chamber connected to said vent, a pouch over said air chamber, a pneumatic, a valve actuated by the expansion of said pouch under the influence of the air admitted into said chamber through said record perforation and said tracker bar vent to create vacuum into said pneumatic, said chamber being provided with an air port, a port controlling valve opened by said pneumatic for admitting air through said port into said chamber to maintain vacuum in said pneumatic, another valve opened by said pneumatic, means actuated by said port controlling valve for slowing down the rewinding speed of the record when nearing the end of its rewind, and means actuated by said latter valve for enabling the motor to rewind the record and to shut off the vacuum from the tracker bar.

6. In combination with a player piano, the tracker bar thereof being provided with a rewind control vent, the music record being provided with a rewind control perforation adapted to register with said vent when the record has been played, an air chamber connected to said vent, a pouch over said air chamber, a pneumatic, a valve actuated by the expansion of said pouch under the influence of the air admitted into said chamber through said record perforation and said tracker bar vent to create vacuum into said pneumatic, said chamber being provided with an air port, a port controlling valve opened by said pneumatic for admitting air through said port into said chamber to maintain vacuum in said pneumatic, another valve opened by said pneumatic, means actuated by said port controlling valve for slowing down the rewinding speed of the record when nearing the end of its rewind, means actuated by said latter valve for enabling the motor to rewind the record and to shut off the vacuum from the tracker bar, and means for automatically enabling said latter valves to close when the record is unwound.

In testimony whereof we affix our signatures.

HAROLD A. VAN VALKENBURG.
BURT R. VAN VALKENBURG.